United States Patent
Wilson

[15] 3,675,786
[45] July 11, 1972

[54] OVERHEAD CAB CRANE CONTROL STRUCTURE

[72] Inventor: Ray Wilson, Route #1, Box 102, West Alexandria, Ohio 45381

[22] Filed: Dec. 21, 1970

[21] Appl. No.: 100,021

Related U.S. Application Data

[62] Division of Ser. No. 813,562, April 4, 1969, abandoned.

[52] U.S. Cl. .............................. 212/127, 212/11, 212/130, 294/118
[51] Int. Cl. ............................................. B66c 19/00
[58] Field of Search ..................... 212/127–129, 130–131, 212/11, 22; 294/118, 88

[56] References Cited

UNITED STATES PATENTS

| | | | |
|---|---|---|---|
| 1,874,859 | 8/1932 | Been | 212/128 |
| 2,915,332 | 12/1959 | Cotesworth | 212/127 |
| 3,389,809 | 6/1968 | Wilson | 212/10 |
| 3,462,185 | 8/1969 | Thomas | 294/118 |

Primary Examiner—Harvey C. Hornsby
Attorney—Walter Becker

[57] ABSTRACT

First and second carriages movable along respective rails have block and tackle supporting cables connected to drum mechanism and suspended therefrom to carry load and maintain operator cab level position. A platform is inside the operator cab and a bevel ring gear driven to be rotatable up to 180° in each of opposite directions carries the platform upon which operator control means are mounted. Fluid actuators and cab mounted fluid valves operatively associated therewith are effective for load holding and release with respect to cab control for operator safety. The cab itself is not allowed to turn because of the cable suspension and power lines to and from the cab.

5 Claims, 5 Drawing Figures

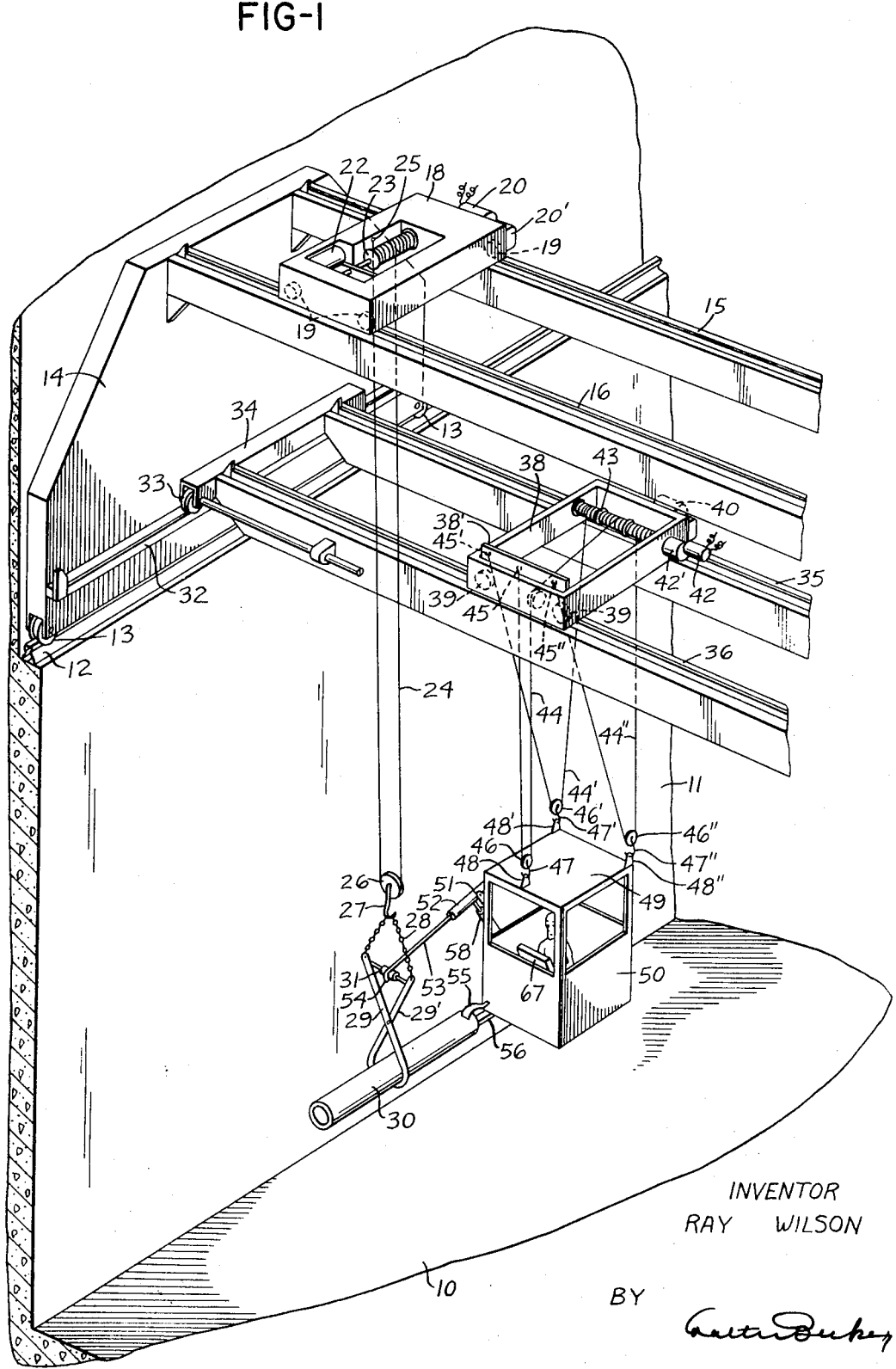

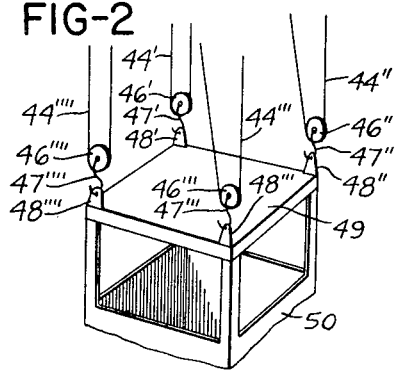
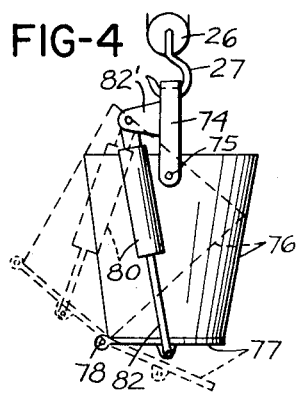
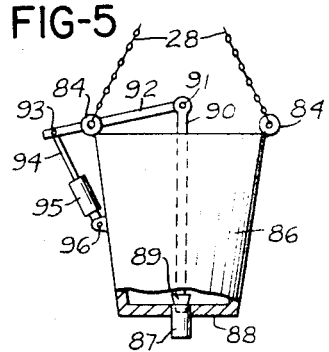
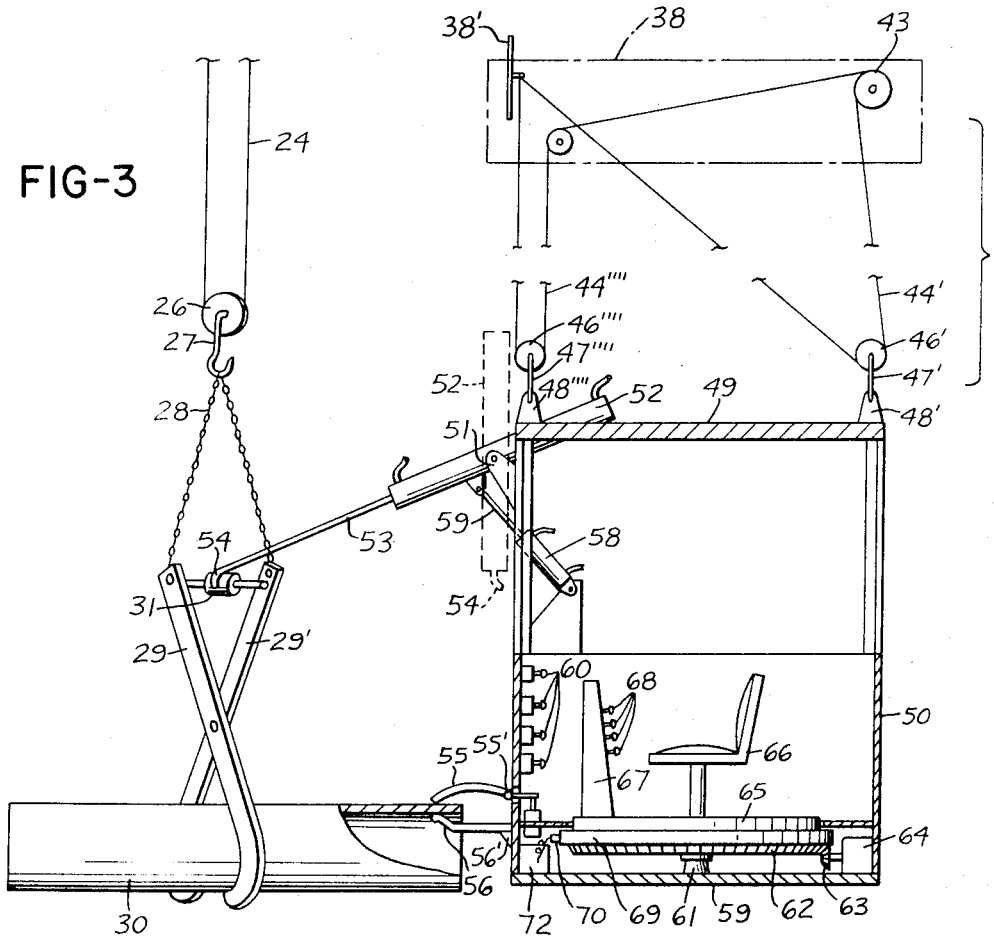
INVENTOR
RAY WILSON

OVERHEAD CAB CRANE CONTROL STRUCTURE

This is a division of my copending application Ser. No. 813,562 filed Apr. 4, 1969 now abandoned.

The present invention relates to travelling cranes or hoists of the type used in foundries, factories, warehouses and the like for conveying heavy loads from place to place. Movement of the load carried by the travelling crane or hoist is controlled by an operator in an overhead cab also movable in directions determined by operation of cable winch and other carriage drive mechanism. My earlier U.S. Pat. Nos. 3,300,058 issued Jan. 24, 1967 and 3,389,809 issued June 25, 1968 disclose related crane construction and beam structure. The disclosure of the aforementioned patents is being incorporated herein by reference.

Improvements are made over the previous travelling crane and hoist disclosures such that greater flexibility of control and cab movement is provided in accordance with the present invention. Also the present invention provides solution to a problem of movement of a load relative to a cab and operator therein. One of the objects of the invention is to enhance safety of the operator and also to enhance maneuverability afforded the operator in the cab to facilitate efficient and safe handling of loads with respect to cable winch and other carriage drive mechanism.

A further object of this invention is to provide a travelling crane cab with a platform that allows the crane operator to be turned into differing angular positions and to control positioning of the operator in variable directions to make the operation more convenient and efficient. This platform is capable of being turned for at least one-half turn in each of opposite directions thereby assuring protection of control wires and cables against possible damage during cab movement.

A further object of this invention is to provide actuator means for interconnecting and maintaining level position of the cab with respect to a load.

Another object of this invention is to provide a hydraulic control means operable from a crane cab for hydraulic system use to actuate shifting, pivoting and other movement of a hook, grasping mechanism and/or ladle for pouring molten metal with a maximum of safety and accuracy in directing unloading at specific locations or work places.

Further objects and advantages of my invention will be apparent from the following description, reference being had to the accompanying drawings wherein preferred embodiments of the present invention are clearly shown as follows:

FIG. 1 is a fragmentary perspective view of an overhead crane and movable cab structure including features in accordance with the present invention.

FIG. 2 is a fragmentary perspective view of a cab leveling arrangement representing a slight modification of that shown in FIG. 1.

FIG. 3 is a partially sectioned side elevational view of a movable cab for a travelling crane or hoist structure having leveling arrangement, rotatable platform and hydraulic control system actuator means further in accordance with the present invention.

FIG. 4 is a side elevational view illustrating hydraulic control actuator means for pivoting or tilting a ladle for dumping or unloading contents thereof.

FIG. 5 is a fragmentary and partially sectioned elevational view of a hydraulically controlled actuating means for a stopper provided with a ladle further in accordance with the present invention.

To improve safety conditions for the operator, a telescoping rod extending from a piston-cylinder actuator means provides selective interconnection of an operator cab and a particular load. Also at least one or more clamping means can be provided adjoining a lower outer periphery of the cab and such clamping means can be pivotally operated by a suitable hydraulically or electromagnetically actuated cylinder control means. The clamping means in combination with the telescoping rod of the piston-cylinder actuator means together maintain positioning of a particular load in a location adjoining the cab. By grasping the load with a suitable bent-over end of the telescoping rod and by a scissors-like clamping the rod is caused to remain relatively fixed with respect to the cab and the cab and rod are not apt to bump into each other in a way which could possibly cause harm or injury to the operator inside the cab.

Also the cab has a rotatable platform carried on a bevel ring gear suitably driven from a drive motor for the platform or table to be rotated at least 180° in either of opposite directions so that an operator situated on the platform or table can be readily turned in a direction suitable to facilitate manipulation of the load and fluid or hydraulic controls associated operatively with the cab for utilization of the crane or hoist.

For assuring maintenance of a level cab position, at least three and alternately four fastening means project upwardly from the cab and have eyelets or openings engageable by hooks carrying pulley means around which suitable cable winch or tackle means can be journalled for adjusting the height or level of the cab with respect to reciprocable carriage means of the crane or hoist. Possible malfunction or failure of one pulley location in conjunction with the clamping and telescoping rod interconnection to the load assures maintenance of level condition of the cab for safety purposes. Suitable motorized drive means are provided for operating a winch or rotatable sleeve to control the cab level maintained by the crane mechanism. Also suitable drive motors are provided for carriage movement relative to beam structure arranged substantially at right angles with respect to each other to permit lateral movement as well as vertical movement and any combinations thereof.

Fluid or hydraulic actuated ladle unloading mechanism is provided. The ladle can also be tilted by use of the actuating mechanism during the unloading operation. Alternately a fluid or hydraulic actuator is provided for moving a stopper into and out of passage closing position with respect to a bottom of a ladle or container carried by the crane or hoist.

Referring more particularly to the structure illustrated in FIG. 1, there is shown a building or structure including a floor 10 and side wall or partition 11 having the crane or hoist mechanism installed therewith. The wall or partition 11 is provided with a rail 12 upon which rollers 13 of a crane side frame 14 can be reciprocally moved to and fro by a suitable energizable electric or fluid motor not shown in the drawing. It is to be understood that a corresponding side frame is provided relative to a wall or partition in a location opposite to that represented by the reference numeral 14. A pair of stationary rails 15 and 16 can be provided extending substantially horizontally between corresponding side frames. These rails are fixed or stationary with respect to the side frames and are adapted to traverse to and fro in accordance with movement of the side frame. A lateral movement relative to the rails 15, 16 is afforded by means of a first carriage 18 having a substantially rectangular shape and provided with plural rollers 19 which engage the top surface of the rails 15, 16 respectively. A suitable drive mechanism or motor means 20 is provided on one side of the carriage 18 and can be geared or otherwise interconnected for driving engagement with one of the wheels or rollers 19 adjacent thereto. The carriage 18 also supports a drive mechanism or motor means 22 operatively connected to a windup drum 23. A cable 24 has one end thereof spirally wound onto the drum 23 and an opposite end 25 of the cable is secured to an inner periphery of the carriage 18. Operation of the drive mechanism 22 causes variation in length of the cable 24 relative to which a suitable pulley 26 is fitted to suspending hook 27 onto which a chain or support means 28 is connected. The chain 28 has opposite ends thereof in engagement with scissors-like arms 29 and 29' which are adapted to form an X-shape. The arms 29, 29' have free ends which are adapted to grasp or embrace a suitable load such as a tube or pipe 30. An actuator means formed of a cylinder housing, a piston reciprocable therein and designated by reference numeral 31 is provided between the ends of the arms 29, 29' to which the chain 28 has connection. Pressurized fluid supply to the actuator means 31 determines the clamping or unclamping operation of the arms 29, 29'.

The side frame 14 is further provided with a rail portion 32 extending longitudinally and spaced laterally to one side of the frame 14. Suitable wheels or rollers 33 traverse this rail portion 32 for movement of a member 34 in a location adjoining the frame 14. A pair of substantially horizontal rails 35, 36 extend laterally from the member 34 to a corresponding member not shown in the perspective view of FIG. 1. A secondary carriage 38 has journalling wheels or rollers 39 traversable on the upper surface of the rails 35, 36. A suitable drive mechanism or motor means 40 electrically energizable or fluid pressure operated can be provided laterally on one side of the carriage 38. A drive motor 42 is provided for reversible rotation of a tubular drum or winch member 43 having suitable cable means 44, 44' and 44" each with ends 45, 45' and 45" connected to the frame of the carriage 38. The box-like frame of the carriage can be provided with an upwardly extending flange to which each of the ends 45, 45' and 45" of the cable means can be secured as shown in FIG. 1. The collective movement and positioning of the cable means with respect to pulleys 46, 46' and 46" results in maintenance of level by way of hooks 47, 47' and 47" relative to apertured flanges 48, 48' and 48" carried by a top portion or roof 49 of a cab means 50. The operation of the drive motor 42 and drive mechanism 20 can occur simultaneously or independently of each other as necessary and as controlled from inside the cab 50. A suitable gear box 20' and 42' can be operatively associated with each drive motor or mechanism respectively.

Laterally on one side of the cab 50 there is a flange 51 upon which a cylinder 52 of an actuator means is pivotally mounted. The cylinder has a piston reciprocable therein and a rod 53 is reciprocable axially with respect to the cylinder 52. This rod 53 has a hook-like end 54 adapted to engage the actuator means 31 and to stabilize the positioning of the load 30 in a location adjoining the cab 50. Further guiding and balancing of the load 30 is provided by means of a clamp having an upper portion 55 and a lower portion 56 as shown in greater detail in FIG. 3 of the drawings.

Referring now more particularly to FIG. 3, the structure identified in FIG. 1 is correspondingly identified by the same reference numerals in FIG. 3. It is to be understood that the top or roof 49 of the cab 50 can be suitably supported by at least three cables and optionally by four cables 44, 44', 44", 44'" and 44"" as illustrated in FIG. 2 of the drawings. Corresponding pulleys 46', 46", 46'" and 46"" are provided with corresponding hooks 47', 47", 47'" and 47"" engageable with respect to upwardly extending flanges 48', 48", 48'" and 48"" secured to the roof 49 of the cab 50.

Referring again to FIG. 3, the level position of the cab 50 is maintained by the cable and pulley inter-action relative to the hooks secured to the flanges at the top or roof of the cab 50. A cable stationary end mounting 38' is illustrated to represent fixing of the ends of cables as noted earlier. The actuator 52 has suitable inlet and outlet conduits at opposite ends thereof for fluid operation and reciprocal movement of the piston inside the cylinder of the actuator 52. Pivotal movement of the actuator 52 relative to the flange 51 occurs by inlet or outlet fluid supply to a further actuator 58 having a reciprocable rod 59 carried by a piston and connected at a rod end suitably to a flange projecting laterally from the actuator 52. The inlet and outlet conduits are shown at opposite ends of the actuator for supply and exhaust of pressurized fluid for reciprocal movement of the piston in the cylinder of the actuator 58. The actuator 58 is suitably anchored to a side projection on the cab 50 as represented in FIG. 3 of the drawings.

Plural hydraulic valves collectively identified by reference numeral 60 in FIG. 3 are provided along inner periphery of the cab 50 and these valves 60 have plungers or control buttons for on-off fluid pressure control for operation of the clamp means 55, 56, for operation of actuator 31 controlling the arms 29, 29' as a grasping tong means and for controlling the telescoping clamping cylinders 31, 52 and 58 respectively.

The clamp portions 55, 56 include a pivotal connection 55' and a fixed support 56' near a lower corner of the cab 50. A suitable actuator 55" has the cylinder and piston reciprocable therein so that a rod connected to the piston can cause clamping movement of the clamping portion 55 for pivotal or tilting movement relative to the journalling of the pin 55' serving as a pivot.

A bottom 59 of the cab 50 has a central journalling support 61 for a bevel ring gear 62 in mesh with a worm or bevel gear 63 reversibly driven by a motor 64. A table or platform 65 is carried on top of the bevel ring gear 62 and a suitable pedestal or chair 66 is mounted on the table or platform 65. Also mounted on the table or platform 65 is a control console 67 having plural control button means or actuator controls 68 suitably interconnected by wiring to a slip ring means 69 with respect to which corresponding brush means 70 are electrically engageable during rotating movement of the bevel ring gear. The controls 68 by means of the slip rings and brushes 69, 70 determine electrical actuation of driving mechanism or electrically energizable motors for drums, carriages and the like. The table or platform 65 is rotatable for at least 180° in each of opposite directions. This rotatable movement of the table or platform 65 can occur in either a clockwise or counter-clockwise manner. Thus, an operator seated upon the pedestal or chair 66 can be directed or aligned to be able to see in the direction of a particular loading or unloading place. The platform 65 is so controlled that the operator can turn himself in effect into any 360° location to make it convenient for operating the crane or hoist mechanisms associated with the cab 50. Optionally, the bevel ring gear 62 can be provided with a downwardly projecting abutment engageable with one or more blocks extending upwardly from the bottom or floor 60 of the cab 50 to avoid excessive turning of the platform 65. Such abutment and block means cooperable with each other would establish limits of rotation if desired. The block and tackle arrangement including the cable means from which the top of the cab is suspended further can assure against any turning or leaning of the cab in any lateral or sidewise manner. Level positioning of the cab assures safety of the operator therein. Each cable and pulley or block arrangement suspending the cab is separate and therefore any break or malfunction thereof is independent of the other suspending cables which still maintain safe level positioning of the cab for the operator therein. A suitable hydraulic or fluid compressor pump means 72 is indicated in a lower corner of the cab 50 and such compressor or pump means is used to operate fluid pressure actuators having piston cylinder means for manipulating the load by means of actuators 31, 52 and 58 for example. The actuator 31 permits tong operation of the arms 29, 29' for picking up pipes, rolls of sheet metal and other objects. The actuators 52 and 58 operate for holding the bar or rod means associated with the actuator 31 used for maintaining the load 30 in position.

As the platform 65 turns with the operator in the cab itself, the turning movement of the seat 66 is in effect independent of the position of the cab 50 as maintained by the cable, winch and block arrangement described earlier.

A further improvement in accordance with the present invention is illustrated by the views of FIGS. 4 and 5. In FIG. 4 the pulley or block 26 has the hook 27 journalled therewith engaged with a carrier 74 pivotally connected at 75 to a ladle 76 or other suitable container. This ladle or container 76 has a bottom flap 77 pivotally journalled about a pin 78. An actuator 80 having a cylinder and piston reciprocable in the cylinder together with a piston rod 82 pivotally connected to the bottom flap 77 as shown in FIG. 4 so that an unloading or discharging operation can result in depositing of material carried in the ladle or container 76. The actuator 80 has a cylinder end thereof connected to a flange 82' extending as a bracket from the carrier 74 so that a tilting movement can occur with pivotal action with respect to the pivot 75. The axial reciprocable movement of the piston rod 82 determines the opening and closing of the bottom flap as well as the simultaneous pivotal movement of the ladle or container 76. The actuator 80 can have opposite inlet and outlet conduits thereto for fluid pressure operation by which a dumping of slag or other molten metal type materials can be accomplished.

FIG. 5 shows the chain 28 secured to eyelets or loops 84 secured to a top edge or rim of another ladle or container 86 having an exit conduit 87 centrally of the bottom 88 of the container. A plug or stopper 89 is reciprocally movable as carried by a rod 90 having a pivot connection 91 to a crank lever 92 pivotally secured at 93 to a piston rod 94 of an actuator 95. The actuator 95 has a cylinder and piston reciprocable therein. One cylinder end of the actuator 95 is connected pivotally to a flange 96 secured laterally to one side of the ladle or container 86. Pressurized fluid supply to the actuator 95 can occur to opposite inlet and outlet conduits provided at remote ends of the actuator 95 in a well-known manner. The fluid pressure actuator operation is controlled and manipulated by one of the hydraulic valves 60 inside the cab 50. The ladle or container unloading structures disclosed by FIGS. 4 and 5 permit remote control unloading of hot molten metal, slag and the like without endangering any operating personnel with the hot material being dumped or unloaded.

It is to be understood that more than one set of hooks with power operating mechanism as well as scissors-like tongs can be operated from a particular cab. Also the hooks can be made larger or smaller for use with differing operations and jobs to be done.

The cab 50 itself does not turn even though the platform 65 is rotatable therein. Since the cab 50 does not rotate itself, an additional advantage is realized in that the cables, power lines and fluid conduits leading to and from the cab can be secured thereto without problems of leakage, and inadvertent malfunction of fluid operated or electrically operated drive mechanisms.

It is, of course, to be understood that the present invention is, by no means, limited to the particular constructions shown in the drawings but also comprises any modifications within the scope of the appended claims.

What I claim is:

1. An overhead crane structure comprising: rail means supported in paired relationship to each other, first and second carriage means movable on said rail means, first and second windup drum mechanism journalled with respect to each carriage means, cable means individually secured to said first and second windup drum mechanism and each respectively adjustable in level establishing length relative to respective carriage means, an operator cab suspended by said cable means totalling at least three in number between one of said carriage means and said cab, a block and tackle means being carried by each cable means, a pair of crossed-arm tongs being suspended independently from one block and tackle means for load carrying therewith, fluid actuator means having cylinder and piston rod connection between arm ends operable for grasping and releasing load therefrom, and fluid operated clamping means extending laterally from said cab for load stabilization between said crossed-arm tongs and said cab.

2. An overhead crane structure according to claim 1, in which said fluid operated clamping means are in a lower corner location of said cab, and additional fluid actuator means with cylinder and piston rod connection provide for load stabilization relative to said first mentioned actuator means between said crossed-arm tongs.

3. An overhead crane structure according to claim 2, in which flanges projecting laterally from said cab provide pivotal connection for both first and second additional actuator means.

4. An overhead crane structure according to claim 2, in which fluid valves are mounted in said cab in a position accessible from said platform and operable at least for actuation of said clamping means.

5. An overhead crane structure according to claim 4, in which a pressurized fluid source is cab mounted next to said clamping means.

* * * * *